(12) United States Patent
Shinohara et al.

(10) Patent No.: US 9,582,959 B2
(45) Date of Patent: Feb. 28, 2017

(54) REFLECTION STRUCTURE, LIGHT GUIDE BODY, LIGHT EMITTING DEVICE, AND GAME MACHINE

(71) Applicant: OMRON Corporation, Kyoto-shi, Kyoto (JP)

(72) Inventors: Masayuki Shinohara, Kyoto (JP); Yoshimasa Osumi, Kyoto (JP); Yoshihiko Takagi, Kyoto (JP); Norikazu Kitamura, Osaka (JP); Takaaki Suzumura, Shiga (JP); Junya Fujita, Aichi (JP)

(73) Assignee: OMRON Corporation, Kyoto (JP)

( * ) Notice: Subject to any disclaimer, the term of this patent is extended or adjusted under 35 U.S.C. 154(b) by 261 days.

(21) Appl. No.: 14/587,737

(22) Filed: Dec. 31, 2014

(65) Prior Publication Data
US 2015/0235508 A1    Aug. 20, 2015

(30) Foreign Application Priority Data

Feb. 20, 2014   (JP) .................................. 2014-031028

(51) Int. Cl.
*A63F 13/10* (2006.01)
*G07F 17/32* (2006.01)
*F21V 8/00* (2006.01)

(52) U.S. Cl.
CPC .......... *G07F 17/3211* (2013.01); *G02B 6/006* (2013.01); *G02B 6/0036* (2013.01); *G02B 6/0068* (2013.01); *G07F 17/3202* (2013.01)

(58) Field of Classification Search
CPC ....... A63F 13/10; G02F 1/13452; G07F 17/32
See application file for complete search history.

(56) References Cited

FOREIGN PATENT DOCUMENTS

JP          2003-519810 A    6/2003
WO          01/50444 A1      7/2001

*Primary Examiner* — Omkar Deodhar
(74) *Attorney, Agent, or Firm* — Osha Liang LLP

(57) ABSTRACT

A reflection structure configured to be disposed on a light guide body that guides a light beam incident from a light source and causes the light beam to exit from a light emitting area set in a light exit surface, having a reflection surface that reflects the light beam emitted from the light source toward the light emitting area. When the reflection structure is viewed from a direction perpendicular to the light exit surface, a pointed end is arranged in a direction orthogonal to a traveling direction of the reflected light beam, and an angle formed between the traveling direction of the reflected light beam and a normal direction of an end edge of the reflection surface connected to the pointed end is less than or equal to $-38.327x^2+152.3x-94.014$, wherein x is a refractive index of the light guide body.

18 Claims, 13 Drawing Sheets

FIG. 5

| Material | Refractive index | α | β |
|---|---|---|---|
| High-refractive-index resin | 1.65 | 19 degrees to 71 degrees | 53 degrees or less |
| PC | 1.585 | 19 degrees to 71 degrees | 51 degrees or less |
| Acrylic resin | 1.49 | 20 degrees to 80 degrees | 48 degrees or less |

FIG. 6

| Refractive index | Angle β [deg.] | | | | | | | | | | |
|---|---|---|---|---|---|---|---|---|---|---|---|
| | 45 | 46 | 47 | 48 | 49 | 50 | 51 | 52 | 53 | 54 | 55 |
| 1.65 | ○ | ○ | ○ | ○ | ○ | ○ | ○ | ○ | ○ | × | × |
| 1.585 | ○ | ○ | ○ | ○ | ○ | ○ | ○ | × | × | × | × |
| 1.49 | ○ | ○ | ○ | ○ | × | × | × | × | × | × | × |

REFLECTION STRUCTURE, LIGHT GUIDE BODY, LIGHT EMITTING DEVICE, AND GAME MACHINE

CROSS-REFERENCE TO RELATED APPLICATION

This application is based on Japanese Patent Application No. 2014-031028 filed with the Japan Patent Office on Feb. 20, 2014, the entire contents of which are incorporated herein by reference.

BACKGROUND

Field

The present invention relates to a reflection structure included in a light guide body that guides a light beam incident from a light source and causes the light to exit from a light exit surface, a light guide body provided with the reflection structure, and a light emitting device and a game machine that are provided with the light guide body.

Related Art

Conventionally, there has been well known a technique in which a light beam emitted from a light source is incident through a side surface of a light guide plate, and reflected by a reflection pattern (reflection structure) provided on a back surface side of the light guide plate, and caused to exit from a surface of the light guide plate.

For example, WO2001/050444 (published on Jul. 12, 2001) discloses a technique in which, as illustrated in FIG. 14, a triangular prism type reflection pattern 130 is arranged in an area having a shape corresponding to a predetermined character in a back surface 124 of a light guide plate 120, and a different character is displayed on a side of a surface 123 of the light guide plate 120 by alternately lighting a light source 100 and a light source 110.

SUMMARY

In a case where the triangular prism type reflection pattern 130 is formed by injection molding, as illustrated in FIG. 15, a side surface (end) 132 of the reflection pattern 130 does not become a sharp edge, but a shear drop is generated. As illustrated in FIG. 16, the light beam incident through the side of the side surface (end) 132 of the reflection pattern 130 (in a direction parallel to a reflection surface 131) is reflected by the shear drop of the side surface 132, and leaks partially from the surface 123 of the light guide plate 120. Therefore, unintended emission of the reflection pattern 130 is observed in the surface 123 of the light guide plate 120, which hinders a light separating presentation on the surface 123 of the light guide plate 120.

One or more embodiments of the present invention provides a reflection structure, a light guide body, a light emitting device, and a game machine that can constrain the emission of the reflection structure irradiated with the light beam from the end side of the reflection structure.

According to one or more embodiments of the present invention, a reflection structure that is included in a light guide body configured to guide a light beam incident from a light source and cause the light beam to exit from a light emitting area set in a light exit surface, the reflection structure including a reflection surface configured to reflect the light beam emitted from the light source toward the light emitting area. When the reflection structure is viewed from a direction perpendicular to the light exit surface, a pointed end is arranged in a direction orthogonal to a traveling direction of the reflected light beam, and an angle formed between the traveling direction of the reflected light beam and a normal direction of an end edge of the reflection surface connected to the pointed end is less than or equal to $-38.327x^2+152.3x-94.014$ (x is a refractive index of the light guide body).

As described above, in the conventional triangular prism type reflection pattern (reflection structure), emission of the reflection pattern irradiated with the light beam from the end side of the reflection pattern may occur, because the shear drop of the side surface is generated during the injection molding.

An end of the reflection structure is formed into a pointed end, and the angle formed between the traveling direction of the reflected light beam and the normal direction of the end edge of the reflection surface connected to the pointed end is less than or equal to a value obtained by the above formula, which allows the constraint of the emission of the reflection structure irradiated with the light beam from the pointed end side.

Additionally, in one or more embodiments of the present invention, because the shear drop is hardly generated unlike the conventional triangular prism type reflection pattern even if the reflection structure is formed in the light guide body by the injection molding, there is an advantage that the reflection structure can easily be formed by injection molding.

In the reflection structure according to one or more embodiments of the present invention, the reflection structure may be formed into a spindle shape when viewed from a direction perpendicular to the light exit surface.

In the above configuration, the reflection structure that constrains the emission of the reflection structure irradiated with the light beam from the pointed end side of the reflection structure can suitably be obtained.

Further, in the reflection structure according to one or more embodiments of the present invention, the light beam may totally be reflected.

In the above configuration, light reflection efficiency of the reflection structure can be improved.

According to one or more embodiments of the present invention, a light guide body includes the reflection structure.

In the above configuration, the light guide body that constrains the emission of the reflection structure irradiated with the light beam from the pointed end side of the reflection structure can be made.

In a light guide body according to one or more embodiments of the present invention, the light emitting area may include at least a first light emitting area where a first light beam exits and a second light emitting area where a second light beam exits, the second light beam being incident from a direction substantially orthogonal to the first light beam, and when the light guide body is viewed from a direction perpendicular to the light exit surface, the reflection structure reflecting the first light beam toward the first light emitting area may be arranged such that the pointed end is located in a direction substantially orthogonal to the traveling direction of the first light beam, and the reflection structure reflecting the second light beam toward the second light emitting area may be arranged such that the pointed end is located in a direction substantially orthogonal to the traveling direction of the second light beam.

In the above configuration, in a case where the first light beam is incident to the light guide body, the first light beam is reflected toward the first light emitting area by the reflection structure that is arranged such that the pointed end is located in the direction substantially orthogonal to the traveling direction of the first light beam. Therefore, the emission of the first light emitting area is generated in the light exit surface of the light guide body. At this point, although the reflection structure corresponding to the second light emitting area is irradiated with the first light beam from the pointed end side, the emission of the second light emitting area is not observed because the emission of the reflection structure irradiated with the first light beam is constrained.

On the other hand, in a case where the second light beam is incident to the light guide body, the second light beam is reflected toward the second light emitting area by the reflection structure that is arranged such that the pointed end is located in the direction substantially orthogonal to the traveling direction of the second light beam. Therefore, the emission of the second light emitting area is generated in the light exit surface of the light guide body. At this point, although the reflection structure corresponding to the first light emitting area is irradiated with the second light beam from the pointed end side, the emission of the first light emitting area is not observed because the emission of the reflection structure irradiated with the second light beam is constrained.

Accordingly, in the above configuration, the light separating presentation can suitably be performed in the first light emitting area and the second light emitting area on the light exit surface of the light guide body.

In a light guide body according to one or more embodiments of the present invention, the first light emitting area and the second light emitting area may partially overlap with each other.

In the above configuration, the first light emitting area and the second light emitting area are switched and displayed in the identical area on the light exit surface of the light guide body, so that various visual presentations can be performed by the light guide body.

According to one or more embodiments of the present invention, a light emitting device includes the light guide body, and a light source configured to emit a light beam to the light guide body.

In the above configuration, the emission of the reflection structure irradiated with the light beam from the pointed end side of the reflection structure is constrained, so that the light emitting device that suitably performs the light separating presentation on the light exit surface of the light guide body can be made.

In a light emitting device according to one or more embodiments of the present invention, the light source may be a light emitting diode (LED).

In the above configuration, the light source that emits the light beam having high directionality can suitably be obtained.

A light emitting device according to one or more embodiments of the present invention may further include a light flux controller configured to control a light flux of the light beam emitted from the light source.

In the above configuration, the light emitting device can effectively perform a visual presentation by changing the light flux of the light beam emitted from the light source.

According to one or more embodiments of the present invention, a game machine includes the light emitting device.

In the above configuration, the emission of the reflection structure irradiated with the light beam from the pointed end side of the reflection structure is constrained, so that the game machine that suitably performs the light separating presentation on the light exit surface of the light guide body can be made.

Thus, a reflection structure according to one or more embodiments of the present invention is included in the light guide body configured to guide the light beam incident from the light source and cause the light beam to exit from the light emitting area set in the light exit surface, the reflection structure includes the reflection surface configured to reflect the light beam emitted from the light source toward the light emitting area. When the reflection structure is viewed in the direction perpendicular to the light exit surface, the pointed end is arranged in the direction orthogonal to the traveling direction of the reflected light beam, and the angle formed between the traveling direction of the reflected light beam and the normal direction of the end edge of the reflection surface connected to the pointed end is less than or equal to $-38.327x^2+152.3x-94.014$ (x is the refractive index of the light guide body).

Accordingly, one or more embodiments of the present invention can provide the reflection structure that constrains the emission of the reflection structure irradiated with the light beam from the end side of the reflection structure, the light guide body provided with the reflection structure, and the light emitting device and the game machine that are provided with the light guide body.

BRIEF DESCRIPTION OF THE DRAWINGS

FIG. 5 is a table illustrating ranges of an angle α and an angle β according to a material (refractive index) for the light guide plate;

FIG. 6 is a table illustrating a simulation result of existence or non-existence of a light beam leaking from a surface of the light guide plate when the angle β is changed;

FIG. 7A illustrates the optical path for the angle β of 53 degrees, and FIG. 7B illustrates the optical path for the angle β of 54 degrees;

FIG. 12A is a perspective view illustrating the reflection pattern of the third modification, FIG. 12B is a plan view illustrating the reflection pattern in FIG. 12A, FIG. 12C is a front view illustrating the reflection pattern in FIG. 12A, and FIG. 12D is a side view illustrating the reflection pattern in FIG. 12A;

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Hereinafter, a first embodiment of the present invention will be described with reference to FIGS. 1 to 12. In the first embodiment, a light emitting device including a light guide body in which a reflection structure is formed will be described by way of example.

<Configuration of Light Emission Device 1>

Figure 1:
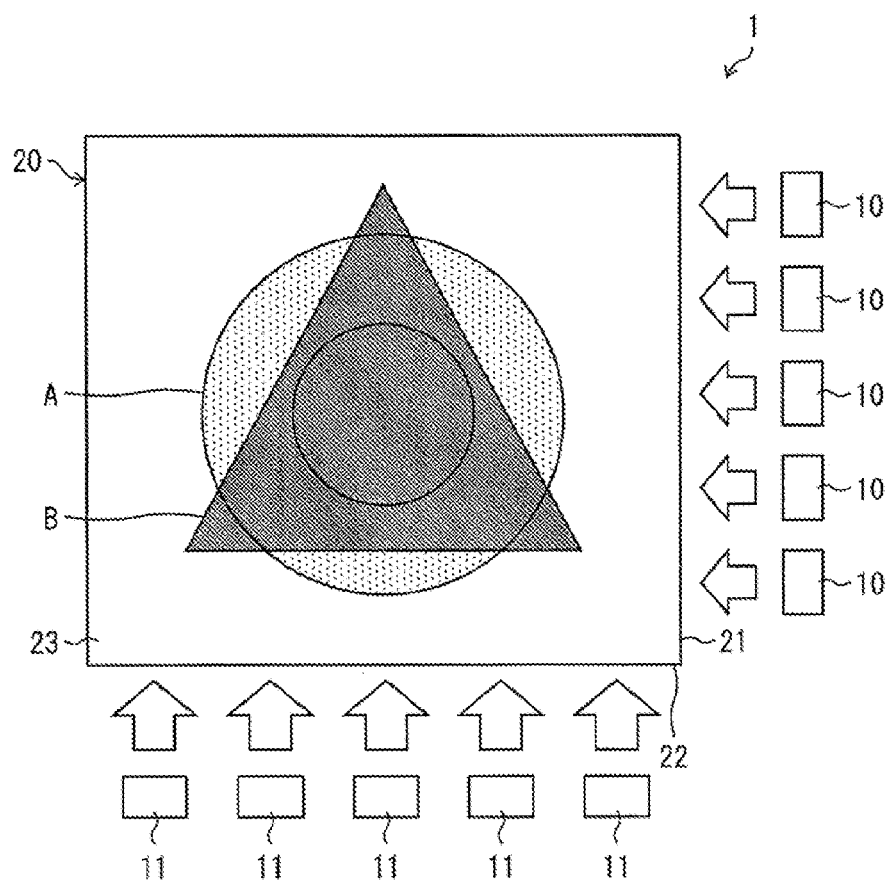
FIG. 1 is a plan view illustrating a light emitting device according to a first embodiment.

FIG. 1 is a plan view illustrating a light emitting device 1 provided with a light guide plate (light guide body) 20 according to the first embodiment. The light emitting device 1 is suitably mounted on game machines such as a pachinko game machine and a slot machine, and performs various visual presentations by switching and displaying objects such as a graphic, a character, and a pattern on a surface (light exit surface) 23 of the light guide plate 20.

As illustrated in FIG. 1, the light emission device 1 includes a light source 10, a light source 11, and the light guide plate 20.

(Light Source 10 and Light Source 11)

The light source 10 and the light source 11 are light emitting elements that emit light beams toward side surfaces of the light guide plate 20.

A plurality of light sources 10 are arranged along a side of a first side surface 21 of the light guide plate 20, and the light beam (first light beam) emitted from each of the light sources 10 is incident to the light guide plate 20 from the first side surface 21. A plurality of light sources 11 are arranged along a side of a second side surface 22 of the light guide plate 20, and the light beam (second light beam) emitted from each of the light sources 11 is incident to the light guide plate 20 from the second side surface 22.

The first side surface 21 and the second side surface 22 of the light guide plate 20 are adjacent to each other while forming an angle of about 90 degrees. The light source 10 is arranged such that an optical axis of the light source 10 is oriented orthogonal to the first side surface 21, and the light source 11 is arranged such that an optical axis of the light source 11 is oriented orthogonal to the second side surface 22. Therefore, the light beam emitted from the light source 10 and the light beam emitted from the light source 11 are incident to the light guide plate 20 from directions substantially orthogonal to each other.

There is no particular limitation to kinds of the light source 10 and the light source 11. For example, an LED (Light Emitting Diode) having directionality can suitably used as the light sources 10 and 11.

There is no particular limitation to a color combination of the light beams emitted from the light sources 10 and 11, but the color combination is properly selected according to light emitting areas A and B which will be described later.

There is no particular limitation to the numbers of arranged light sources 10 and light sources 11. For example, one light source 10 may be arranged in the first side surface 21 while one light source 11 may be arranged in the second side surface 22. The light source may be arranged in another side surface of the light guide plate 20.

The light emitting device 1 may include a light flux controller (not illustrated) that controls light fluxes of the light sources 10 and the light sources 11. When the light emitting device 1 includes the light flux controller, the light emitting device 1 can effectively perform a visual presentation by changing the light fluxes of the light beams emitted from the light sources 10 and the light sources 11.

(Light Guide Plate 20)

The light guide plate 20 is a light guide member that guides the light beams emitted from the light source 10 and the light source 11, and causes the light beams to exit from the surface 23. The light guide plate 20 has transparency, and is formed by molding a material (such as polycarbonate and acrylic resin) totally reflecting the light beam into a plate shape.

The light beam, which is emitted from the light source 10 and is incident through the first side surface 21 of the light guide plate 20, propagates in the light guide plate 20 while being totally reflected by the surface 23 and a back surface 24 of the light guide plate 20, and the light beam exits from the light emitting area (first light emitting area) A set in the surface 23 of the light guide plate 20. The light beam, which is emitted from the light source 11 and is incident through the second side surface 22 of the light guide plate 20, propagates in the light guide plate 20 while being totally reflected by the surface 23 and the back surface 24 of the light guide plate 20, and the light beam exits from the light emitting area (second light emitting area) B set in the surface 23 of the light guide plate 20.

In the first embodiment, the annular light emitting area A and the triangular light emitting area B are set in the surface 23 of the light guide plate 20. In a case where the light source 10 is lit, the light emitting area A is displayed in the surface 23 of the light guide plate 20. In a case where the light source 11 is lit, the light emitting area B is displayed in the surface 23 of the light guide plate 20. Accordingly, the light emitting areas A and B can be switched and displayed in the surface 23 of the light guide plate 20 by controlling the lighting of the light sources 10 and 11.

Thus, the light emitting areas A and B are set in the surface 23 of the light guide plate 20 so as to overlap partially with each other, which allows the light emitting areas A and B to be switched and displayed in the identical area on the surface 23 of the light guide plate 20.

Figure 2:
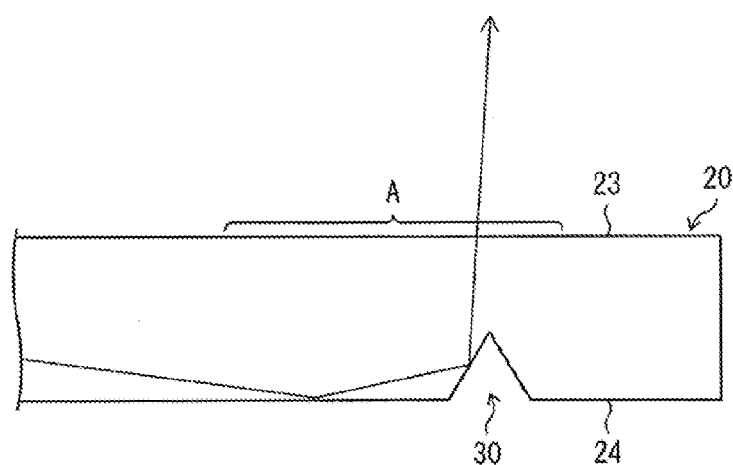
FIG. 2 is a sectional view illustrating a reflection pattern formed in a light guide plate.

FIG. 2 is a sectional view illustrating a reflection pattern (reflection structure) 30 formed in the light guide plate 20.

As illustrated in FIG. 2, in the back surface 24 of the light guide plate 20, a plurality of reflection patterns 30 are formed in a reflection area that is an area corresponding to the annular light emitting area A in order to specularly reflect the light beam incident from the light source 10 toward the light emitting area A (only one reflection pattern 30 is illustrated in FIG. 2). Similarly, in the back surface 24 of the light guide plate 20, the plurality of reflection patterns 30 are formed in a reflection area that is an area corresponding to the triangular light emitting area B in order to specularly reflect the light beam incident from the light source 11 toward the light emitting area B.

In the first embodiment, a plurality of recesses in each of which the back surface 24 of the light guide plate 20 is notched are formed as the reflection patterns 30. As described above, the light guide plate 20 is what is called a see-through type light guide panel made of a transparent material. Therefore, an observer who observes the surface 23 of the light guide plate 20 hardly recognizes the reflection pattern 30 in a case where the light sources 10 and 11 are not lit.

In this regard, the reflection pattern 30 is not limited to the recessed pattern formed by notching the back surface 24 of the light guide plate 20, but the reflection pattern 30 may be formed so as to project outward from the back surface 24 of the light guide plate 20. Further, the reflection pattern 30 is not limited to the configuration in which the reflection pattern 30 and the light guide plate 20 are integrally provided. For example, the reflection pattern 30 may be attached to the back surface 24 of the light guide plate 20. In this case, the reflection pattern 30 may be made of a material that totally reflects the light beam. Therefore, light reflection efficiency of the reflection pattern 30 can be improved.

<Detailed Reflection Pattern 30>

The reflection pattern 30 formed in the light guide plate 20 will be described in detail below.

Figure 3A:
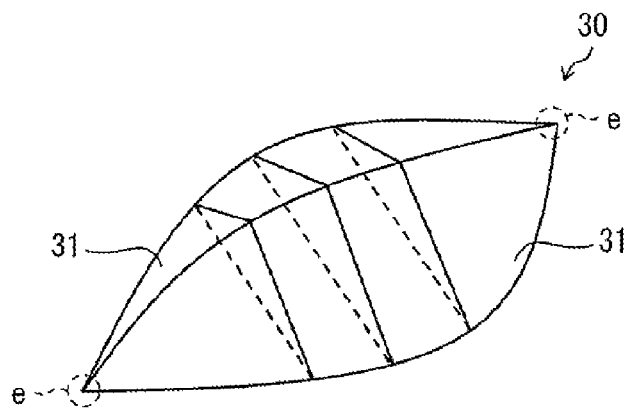
FIG. 3A is a perspective view illustrating the reflection pattern formed in a light guide plate.
Figure 3B:
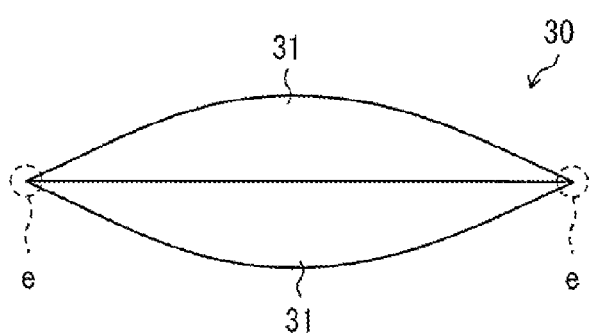
FIG. 3B is a plan view of the reflection pattern.
Figure 3C:
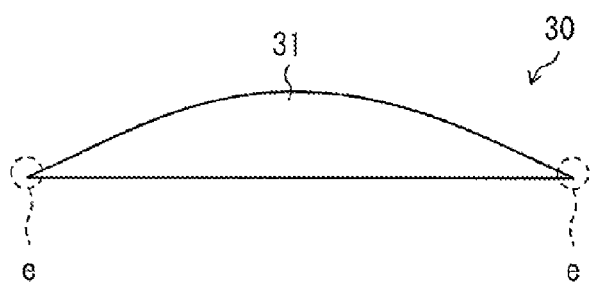
FIG. 3C is a front view of the reflection pattern.
Figure 3D:
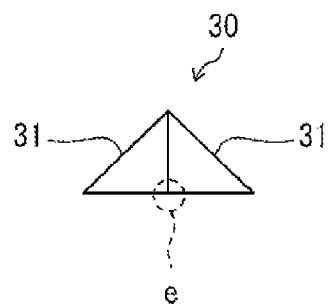
FIG. 3D is a side view of the reflection pattern.

FIG. 3A is a perspective view illustrating the reflection pattern 30 formed in the light guide plate 20, FIG. 3B is a plan view of the reflection pattern 30, FIG. 3C is a front view of the reflection pattern 30, and FIG. 3D is a side view of the reflection pattern 30.

As illustrated in FIGS. 3A to 3D, in the first embodiment, the reflection pattern 30 includes two tilted reflection surfaces 31, and one of the reflection surfaces 31 reflects the light beam incident to the light guide plate 20 toward the surface 23 of the light guide plate 20. The reflection pattern 30 has a spindle shape when viewed from a direction perpendicular to the surface 23 of the light guide plate 20, and the reflection pattern 30 includes a pointed end e. The reflection pattern 30 is perpendicular to the back surface 24 of the light guide plate 20, and a section parallel to the traveling direction of the reflected light beam has a substantially isosceles triangular shape (inverted V-shape), a height (a length in a thickness direction of the light guide plate 20) and a depth (a length in a direction parallel to the traveling direction of the reflected light beam) decrease gradually from a center portion toward the end e of the reflection pattern 30, and the height and the depth become zero at the end e. The shape is hardly lost in the streamlined reflection pattern 30, so that the reflex action of the reflection pattern 30 can stably be obtained.

The reflection pattern 30 having such a shape is arranged such that the end e is located in the direction (hereinafter, referred to as a major axis direction) orthogonal to the traveling direction of the reflected light beam.

Specifically, the reflection patterns 30 are arranged in the reflection area corresponding to the light emitting area A such that the major axis direction of the reflection pattern 30 is orthogonal to the traveling direction (the optical axis direction of the light source 10) of the light beam incident from the light source 10. The reflection patterns 30 are arranged in the reflection area corresponding to the light emitting area B such that the major axis direction of the reflection pattern 30 is orthogonal to the traveling direction (the optical axis direction of the light source 11) of the light beam incident from the light source 11.

Figure 4A:
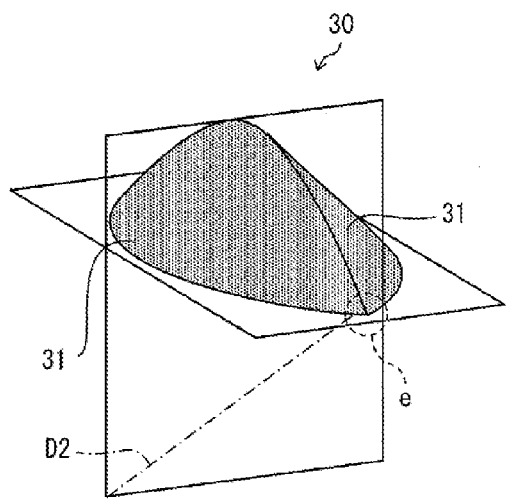
FIG. 4A is a perspective view illustrating a shape of the reflection pattern.
Figure 4B:
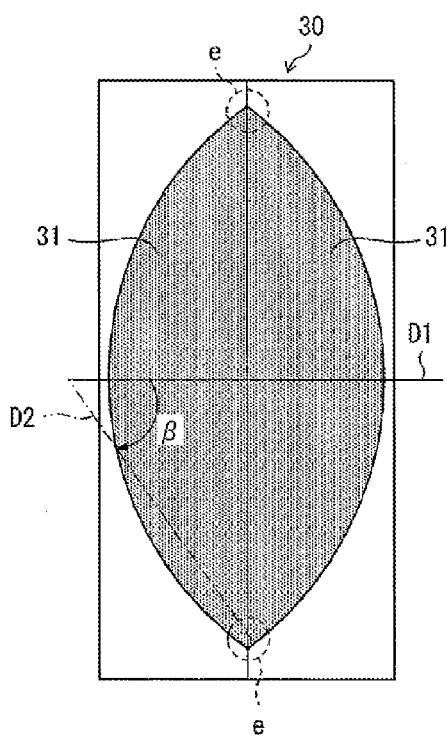
FIG. 4B is a plan view of the shape of the reflection pattern.
Figure 4C:
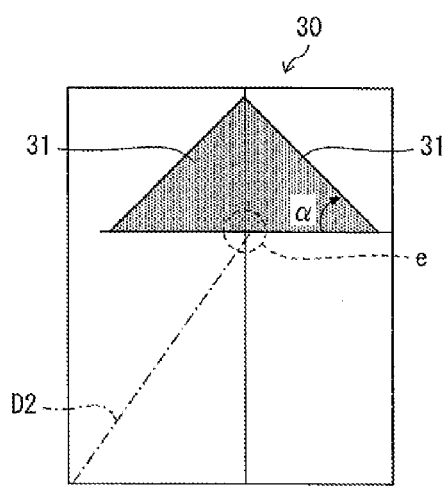
FIG. 4C is a side view of the shape of the reflection pattern.

FIG. 4A is a perspective view illustrating a shape of the reflection pattern 30, FIG. 4B is a plan view of the shape of the reflection pattern 30, and FIG. 4C is a side view of the shape of the reflection pattern 30. As described above, in the conventional triangular prism type reflection pattern, emission of the reflection pattern irradiated with the light beam from the end side of the reflection pattern may occur, because the shear drop of the side surface is generated during the injection molding.

The present inventors have found the following fact. That is, the end of the reflection pattern 30 is formed into the pointed end as illustrated in FIG. 4A, and an angle $\beta$ formed between a traveling direction D1 of the reflected light beam and a normal direction D2 of the end edge of the reflection surface 31 connected to the end e is optimized when the reflection pattern 30 is viewed from the direction perpendicular to the surface 23 of the light guide plate 20 as illustrated in FIG. 4B, which allows the constraint of the emission of the reflection pattern 30 irradiated with the light beam from the side of the end e.

An allowable range of an angle $\alpha$ of the reflection surface 31 to the back surface 24 of the light guide plate 20 in FIG. 4C, in other words, a tilt angle of the reflection surface 31 is specified in a case where the angle $\beta$ is optimized.

FIG. 5 is a table illustrating the ranges of the angle $\alpha$ and angle $\beta$ according to a material (refractive index) for the light guide plate 20. As illustrated in FIG. 5, the range of the angle $\beta$ depends on the material (refractive index) for the light guide plate 20.

For example, in a case where the material for the light guide plate 20 is a high-refractive-index resin (refractive index of 1.65), the emission of the reflection pattern 30 irradiated with the light beam from the side of the end e can be constrained by setting the angle $\beta$ to 53 degrees or less. In this case, the angle $\alpha$ can arbitrarily be changed in the range of 19 degrees to 71 degrees.

In a case where the material for the light guide plate 20 is polycarbonate (PC, refractive index of 1.585), the emission of the reflection pattern 30 irradiated with the light beam from the side of the end e can be constrained by setting the angle $\beta$ to 51 degrees or less. In this case, the angle $\alpha$ can arbitrarily be changed in the range of 19 degrees to 71 degrees.

In a case where the material for the light guide plate 20 is an acrylic resin (refractive index of 1.49), the emission of the reflection pattern 30 irradiated with the light beam from the side of the end e can be constrained by setting the angle $\beta$ to 48 degrees or less. In this case, the angle $\alpha$ can arbitrarily be changed in the range of 20 degrees to 80 degrees.

FIG. 6 is a table illustrating a simulation result of the existence or non-existence of the light beam leaking from the surface 23 of the light guide plate 20 when the angle $\beta$ is changed in a case where the light guide plates 20 having refractive indexes are irradiated with the light beam from the side of the end e of the reflection pattern 30. In FIG. 6, a mark "○" indicates a case that the leakage of the light beam from the surface 23 of the light guide plate 20 is not confirmed, and a mark "x" indicates a case that the leakage of the light beam from the surface 23 of the light guide plate 20 is confirmed.

As illustrated in FIG. 6, in a case where the light guide plate 20 has the refractive index of 1.65, although the leakage of the light beam from the surface 23 of the light guide plate 20 is not confirmed for the angle β of 53 degrees or less, the leakage of the light beam from the surface 23 of the light guide plate 20 is confirmed for the angle β of 54 degrees or more.

In a case where the light guide plate 20 has the refractive index of 1.585, although the leakage of the light beam from the surface 23 of the light guide plate 20 is not confirmed for the angle β of 51 degrees or less, the leakage of the light beam from the surface 23 of the light guide plate 20 is confirmed for the angle β of 52 degrees or more.

In a case where the light guide plate 20 has the refractive index of 1.49, although the leakage of the light beam from the surface 23 of the light guide plate 20 is not confirmed for the angle β of 48 degrees or less, the leakage of the light beam from the surface 23 of the light guide plate 20 is confirmed for the angle β of 49 degrees or more.

Figure 7A:
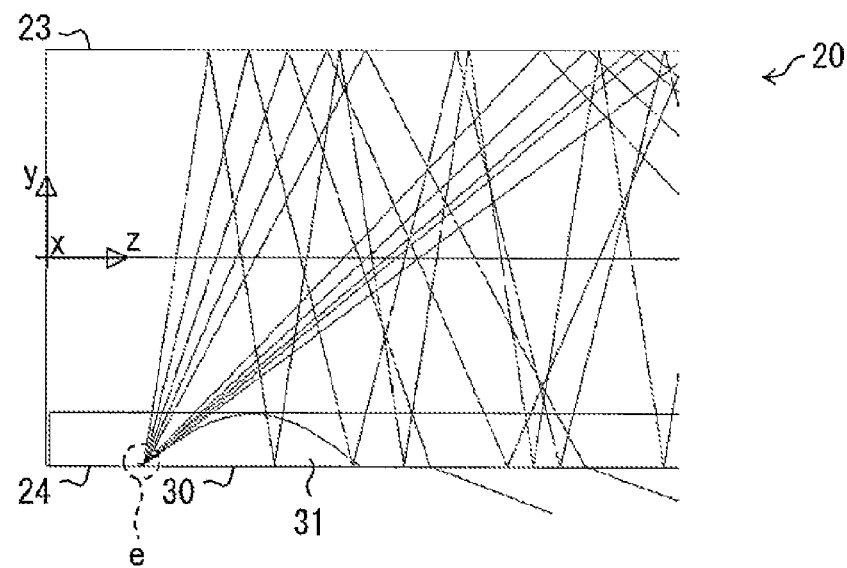
FIGS. 7A-7B are sectional views illustrating an optical path of the light beam when the light beam is incident to the light guide plate having a refractive index of 1.65 from an end side of the reflection pattern.
Figure 7B:
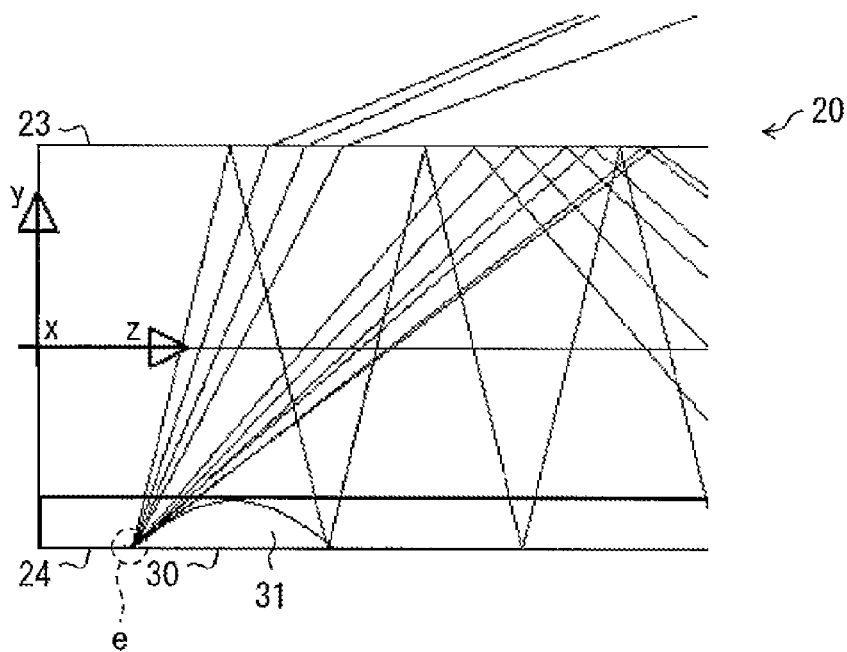

FIGS. 7A-7B are simulation diagrams illustrating an optical path of the light beam when the light beam is incident to the light guide plate 20 having the refractive index of 1.65 from the side of the end e of the reflection pattern 30, FIG. 7A illustrates the optical path for the angle β of 53 degrees, and FIG. 7B illustrates the optical path for the angle β of 54 degrees.

As illustrated in FIG. 7A, for the angle β of 53 degrees, the light beam incident to the light guide plate 20 from the side of the end e of the reflection pattern 30 is reflected by the end e, and the reflected light beam is totally reflected by the surface 23 of the light guide plate 20 without exceeding a critical angle. Therefore, the leakage of the light beam from the surface 23 of the light guide plate 20 is not confirmed.

On the other hand, as illustrated in FIG. 7B, for the angle β of 54 degrees, the light beam incident to the light guide plate 20 from the side of the end e of the reflection pattern 30 is reflected by the end e, and the reflected light beam leaks partially from the surface 23 of the light guide plate 20. Therefore, the leakage of the light beam from the surface 23 of the light guide plate 20 is confirmed.

Figure 8:
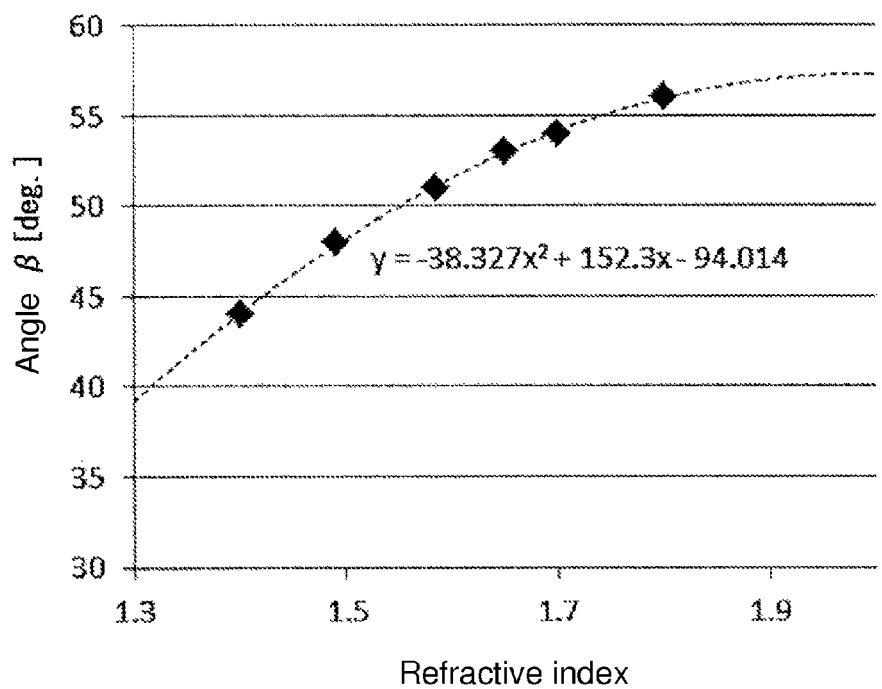
FIG. 8 is a graph illustrating a relationship between the refractive index of the light guide plate and the angle β.

FIG. 8 is a graph illustrating a relationship between the refractive index of the light guide plate 20 and the angle β. In FIG. 8, a horizontal axis indicates the refractive index of the light guide plate 20, and a vertical axis indicates an upper limit of the angle β at which the light beam incident to the light guide plate 20 from the side of the end e can be constrained from leaking from the surface 23 of the light guide plate 20.

As illustrated in FIG. 8, the upper limit of the angle β at which the light beam can be constrained from leaking from the surface 23 of the light guide plate 20 decreases with decreasing refractive index of the light guide plate 20. A relationship between the refractive index of the light guide plate 20 and the angle β is represented by the following formula.

$$y=-38.327x^2+152.3x-94.014$$

wherein y indicates the upper limit of the angle β at which the light beam incident to the light guide plate 20 from the side of the end e can be constrained from leaking from the surface 23 of the light guide plate 20, and x indicates the refractive index of the light guide plate 20.

Accordingly, the reflection pattern 30 that constrains the emission of the reflection pattern 30 irradiated with the light beam from the side of the end e can be made by setting the angle β to the value obtained by the formula or less. For example, the reflection pattern 30 can suitably be formed in the light guide plate 20 by the injection molding.

Figure 9:
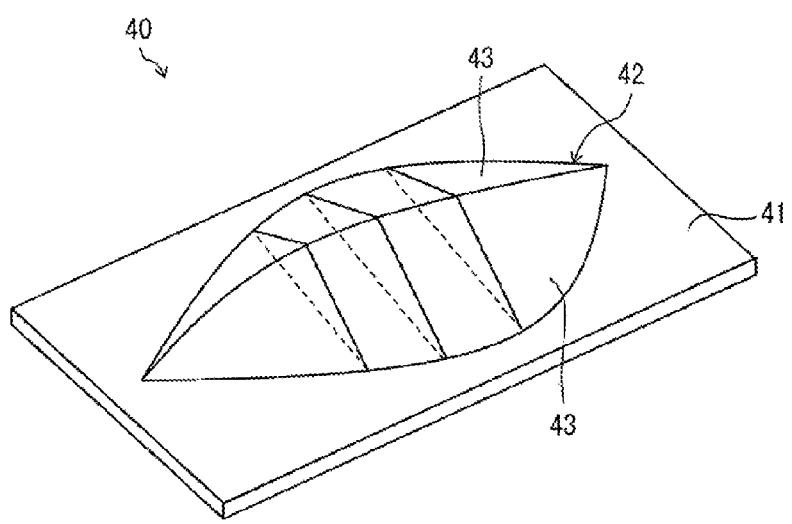
FIG. 9 is a perspective view illustrating a metal mold used to form the reflection pattern in the light guide plate.
Figure 10A:
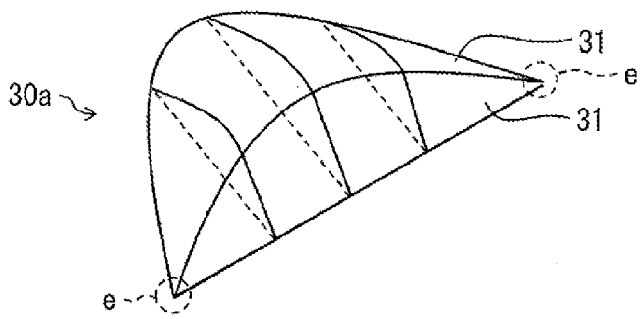
FIGS. 10A to 10D are perspective views illustrating reflection patterns according to a first modification of the first embodiment.
Figure 10B:
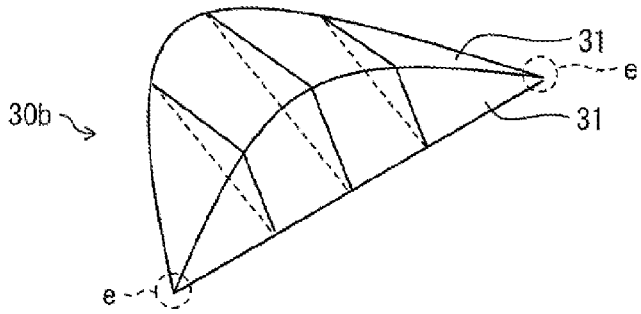
Figure 10C:
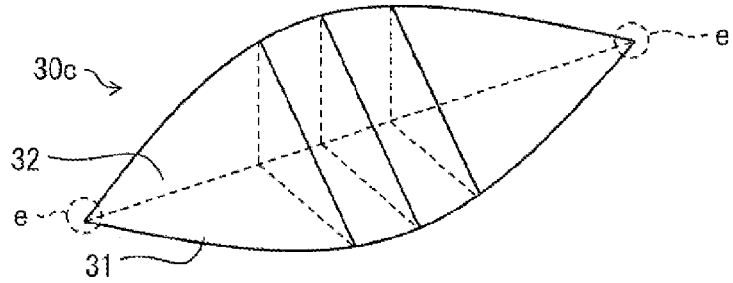
Figure 10D:
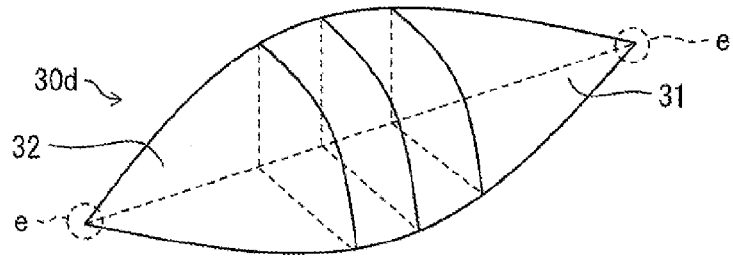
Figure 11A:
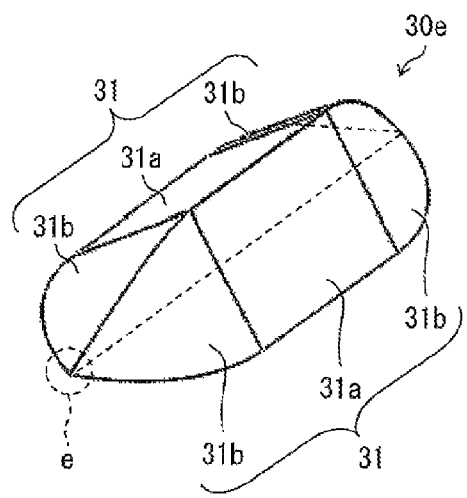
FIGS. 11A to 11D are perspective views illustrating reflection patterns according to a second modification of the first embodiment.
Figure 11B:
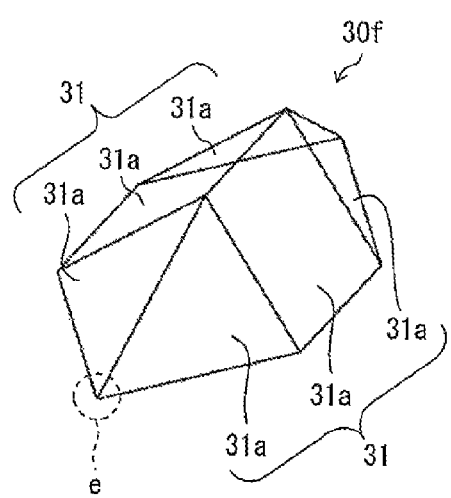
Figure 11C:
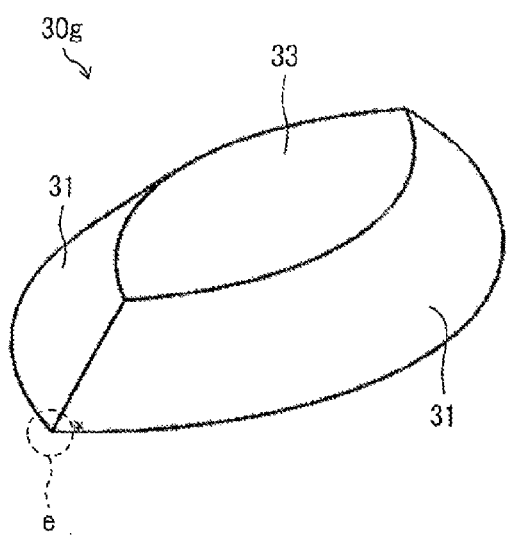
Figure 11D:
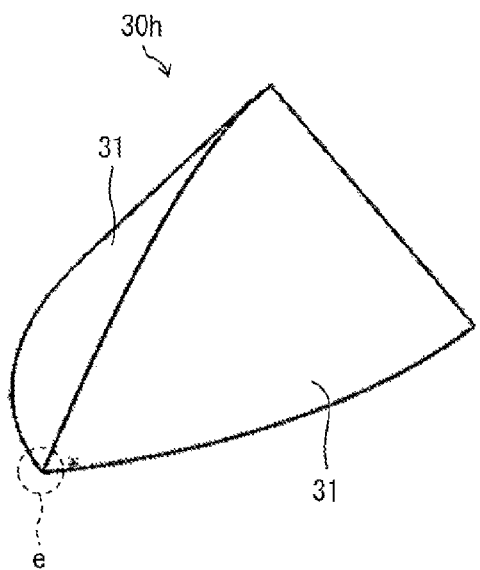

FIG. 9 is a perspective view illustrating a metal mold used to form the reflection pattern 30 in the light guide plate 20. As illustrated in FIG. 9, in a metal mold 40, a plurality of projections 42 having shapes corresponding to the reflection pattern 30 are arranged on a substrate 41 (only one projection 42 is illustrated in FIG. 9). The projection 42 includes a tilted surface 43 corresponding to the reflection surface 31 of the reflection pattern 30.

The use of the metal mold 40 hardly generates the shear drop generated during the injection molding of the conventional triangular prism type reflection pattern, so that the reflection pattern 30 can easily be formed by the injection molding.

<Effect of Light Emitting Device 1>

The light emitting device 1 of the first embodiment includes the light guide plate 20, and, when the reflection pattern 30 is viewed from the direction perpendicular to the surface 23 of the light guide plate 20, the plurality of reflection patterns 30 are arranged such that the pointed end e is located in the direction substantially orthogonal to the traveling direction of the light beam incident from the light source 10 to the reflection area corresponding to the light emitting area A, and the plurality of reflection patterns 30 are arranged such that the pointed end e is located in the direction substantially orthogonal to the traveling direction of the light beam incident from the light source 11 to the reflection area corresponding to the light emitting area B.

Therefore, in a case where the light source 10 is lit, the annular light emitting area A is displayed in the surface 23 of the light guide plate 20 because the light beam incident from the light source 10 is reflected toward the light emitting area A by the reflection pattern 30 corresponding to the light emitting area A. At this point, the reflection pattern 30 corresponding to the light emitting area B is irradiated with the light beam from the light source 10 through the side of the end e, and the angle β is set to $y=-38.327x^2+152.3x-94.014$ or less, whereby the emission of the reflection pattern 30 irradiated with the light beam emitted from the light source 10 is constrained, but the emission of the light emitting area B is not observed.

On the other hand, in a case where the light source 11 is lit, the annular light emitting area A is displayed in the surface 23 of the light guide plate 20 because the light beam incident from the light source 11 is reflected toward the light emitting area A by the reflection pattern 30 corresponding to the light emitting area A. At this point, the reflection pattern 30 corresponding to the light emitting area A is irradiated with the light beam from light source 11 through the side of the end e, and the angle β is set to $y=-38.327x^2+152.3x-94.014$ or less, whereby the emission of the reflection pattern 30 irradiated with the light beam emitted from the light source 11 is constrained, but the emission of the light emitting area A is not observed.

Accordingly, in the first embodiment, the light emitting device 1 that suitably performs a switching presentation of the light emitting areas A and B displayed in the surface 23 of the light guide plate 20 can be made.

Modifications

First Modification

FIGS. 10A to 10D are perspective views illustrating reflection patterns 30 according to a first modification of the first embodiment. The tilt angle (angle α) may be varied in one of the two reflection surfaces 31 as a reflection pattern 30a in FIG. 10A and a reflection pattern 30b in FIG. 10B. As a reflection pattern 30c in FIG. 10C and a reflection pattern 30d in FIG. 10D, one reflection surface 31 may be provided in the arrangement direction of the light source, while the surface on the opposite side is formed into a wall surface 32 perpendicularly sheer with respect to the back surface 24 of the light guide plate 20.

Second Modification

FIGS. 11A to 11D are perspective views illustrating reflection patterns 30 according to a second modification of the first embodiment. As a reflection pattern 30e in FIG. 11A, the reflection surface 31 may have a configuration in which a planar surface 31a and a curved surface 31b are combined. As a reflection pattern 30f in FIG. 11B, the reflection surface 31 may have a configuration in which the three planar surfaces 31a are combined. As a reflection pattern 30g in FIG. 11C, a vertex portion of the reflection pattern 30 may include a flat top surface 33 that is cut along a surface parallel to the back surface 24 of the light guide plate 20. The height (the length in the thickness direction of the light guide plate 20) of the reflection pattern 30g is decreased by forming the top surface 33, so that a low profile of the light guide plate 20 can be achieved. As a reflection pattern 30h in FIG. 11D, the reflection pattern 30 may be cut along a surface that is parallel to the traveling direction of the reflected light beam and perpendicular to the back surface 24 of the light guide plate 20.

Third Modification

Figure 12A:
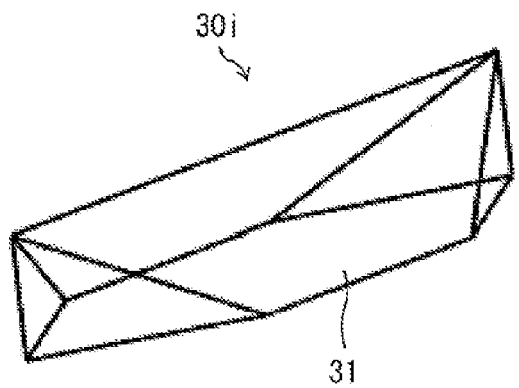
FIGS. 12A-12D are views illustrating a reflection pattern according to a third modification of the first embodiment.
Figure 12B:
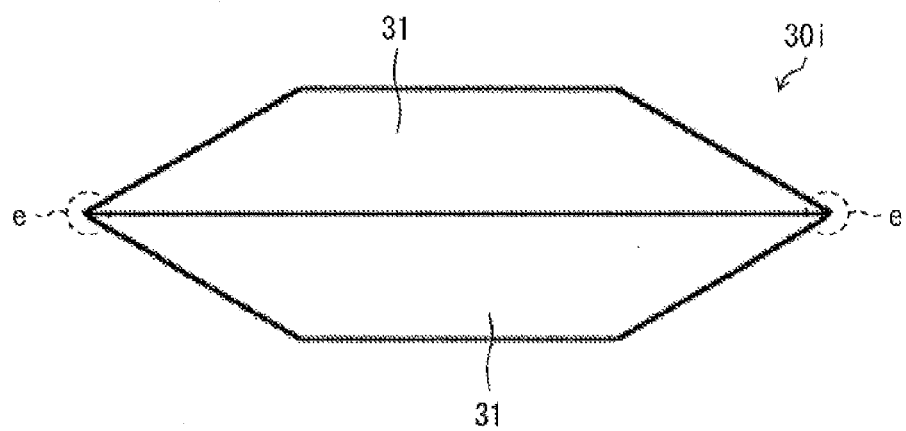
Figure 12C:
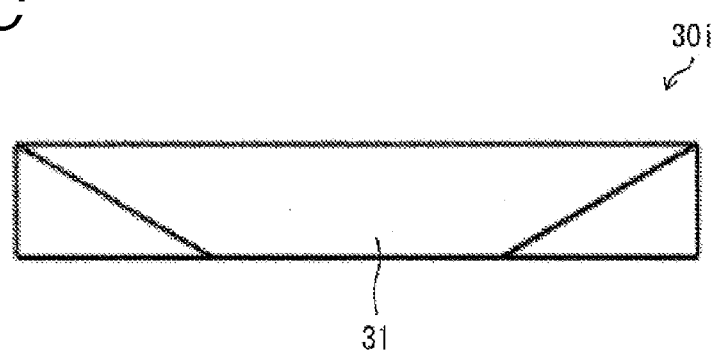
Figure 12D:
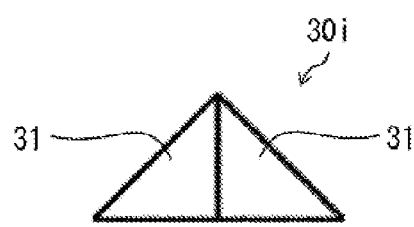

FIGS. 12A-12D are views illustrating a reflection pattern 30i according to a third modification of the first embodiment, FIG. 12A is a perspective view illustrating the reflection pattern 30i of the third modification, FIG. 12B is a plan view illustrating the reflection pattern 30i, FIG. 12C is a front view illustrating the reflection pattern 30i, and FIG. 12D is a side view illustrating the reflection pattern 30i.

As a reflection pattern 30i in FIGS. 12A to 12D, the reflection pattern 30i has the substantially isosceles triangular shape (inverted V-shape) when viewed from the direction perpendicular to the traveling direction of the reflected light beam, and the reflection pattern 30i has a hexagonal shape when viewed from the direction perpendicular to the surface 23 of the light guide plate 20.

The reflection pattern can properly be changed according to the application as long as the above condition is satisfied.

Second Embodiment

A second embodiment of the present invention will be described below with reference to FIG. 13. For the sake of convenience, the component having the function identical to that of the first embodiment is designated by the identical numeral, and the description thereof is not given.

A light emitting device according to the second embodiment differs from the light emitting device of the first embodiment in that emission of a plurality of light emitting areas is generated by light sources arranged along one side surface of a light guide plate.

<Configuration of Light Emission Device 2>

Figure 13:
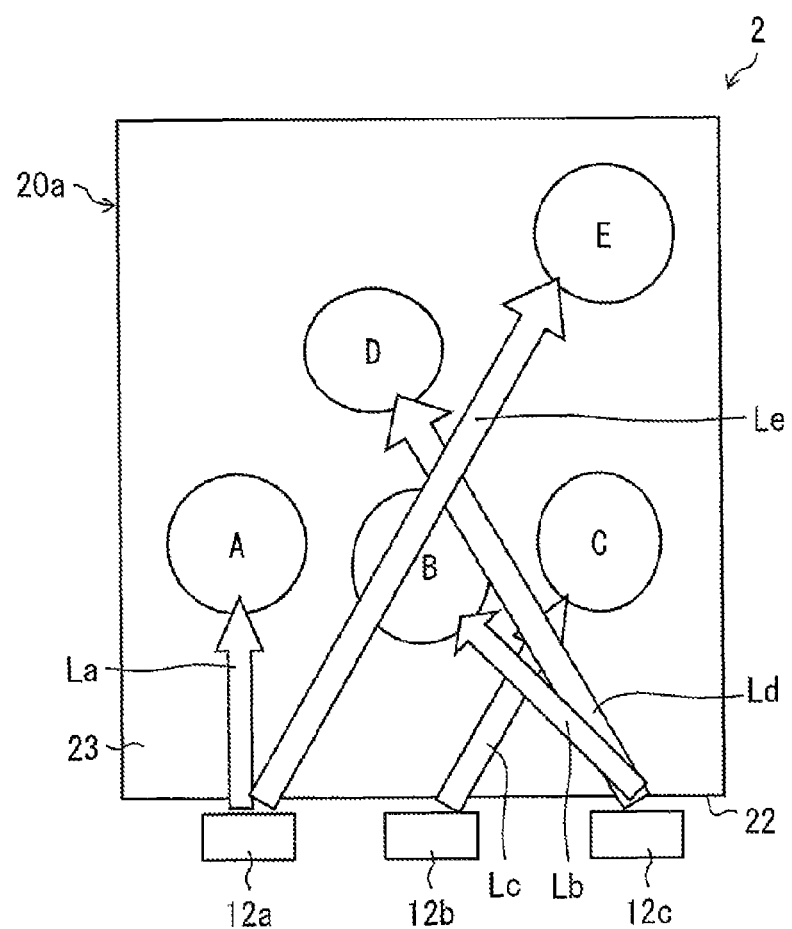
FIG. 13 is a plan view illustrating a light emitting device according to a second embodiment.
Figure 14A:
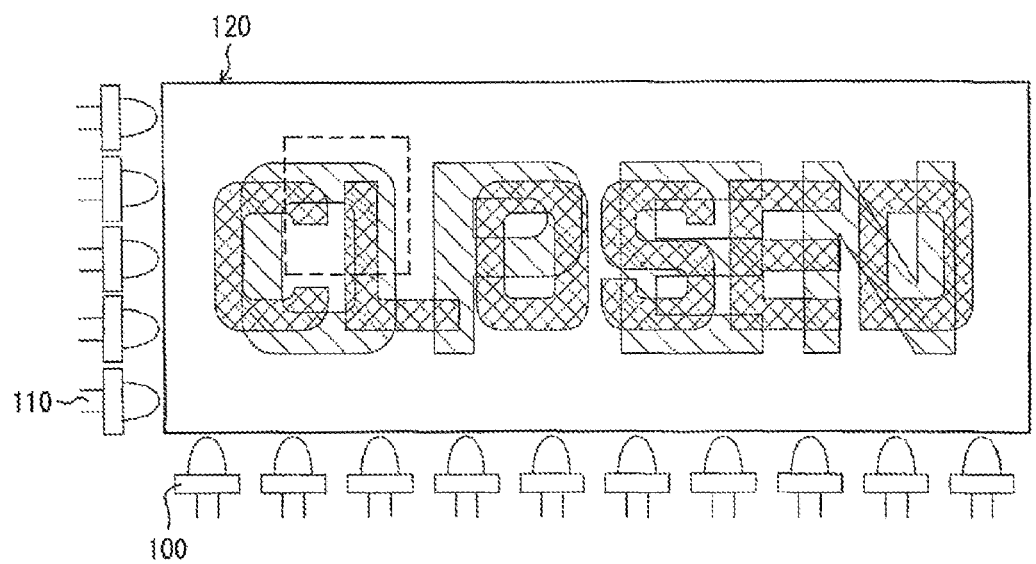
FIG. 14A is a plan view illustrating a conventional light guide plate.
Figure 14B:
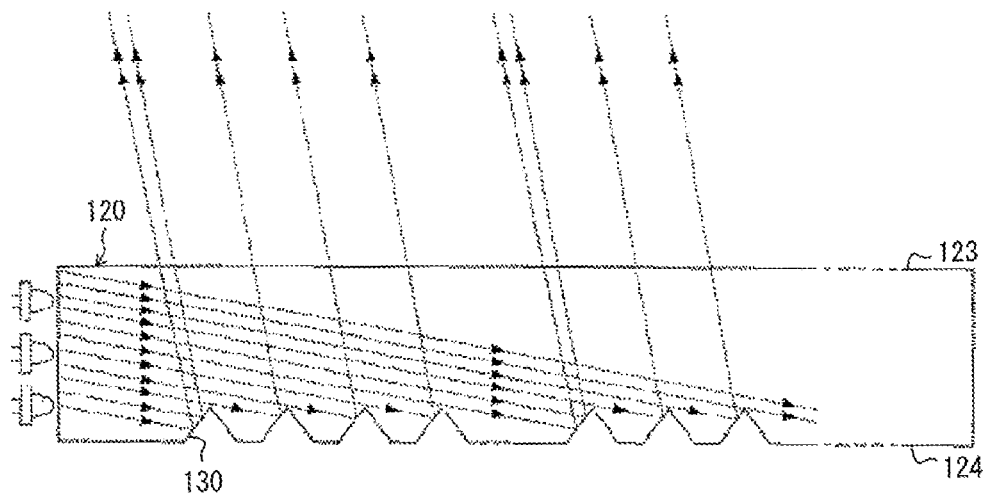
FIG. 14B is a sectional view of the conventional light guide plate.
Figure 15A:
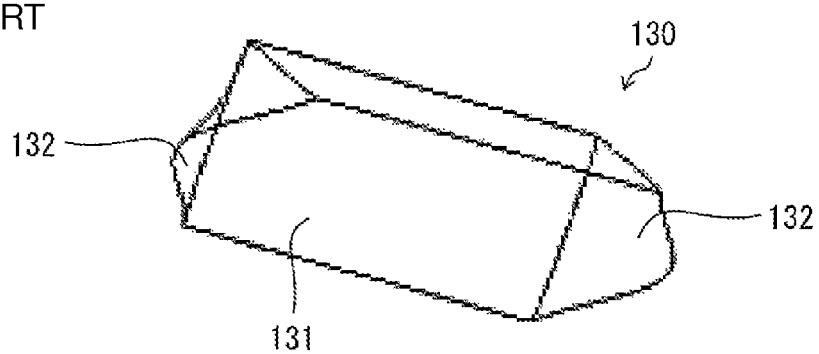
FIG. 15A is a perspective view illustrating a conventional reflection pattern.
Figure 15B:
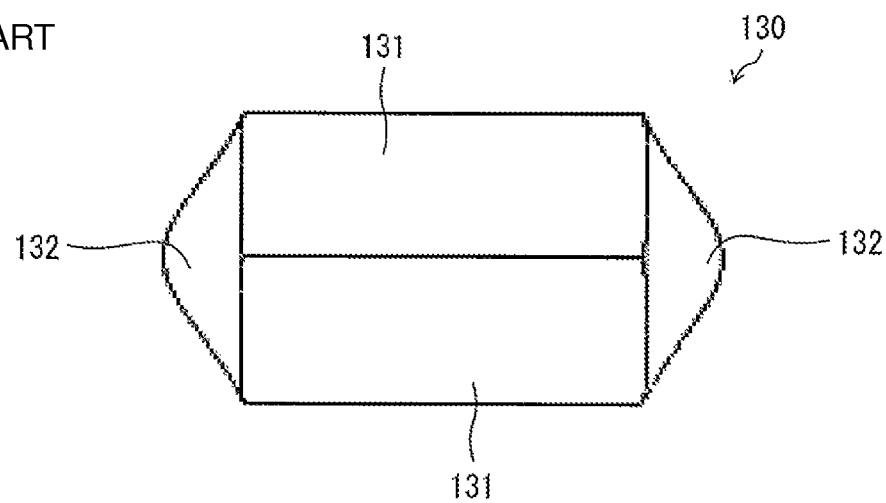
FIG. 15B is a plan view of the conventional reflection pattern.
Figure 15C:
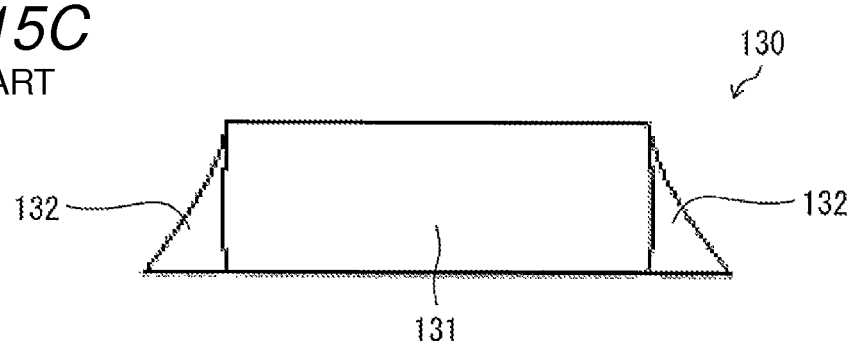
FIG. 15C is a front view of the conventional reflection pattern.
Figure 15D:
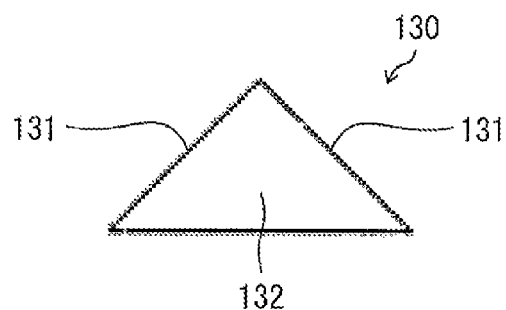
FIG. 15D is a side view of the conventional reflection pattern.
Figure 16:
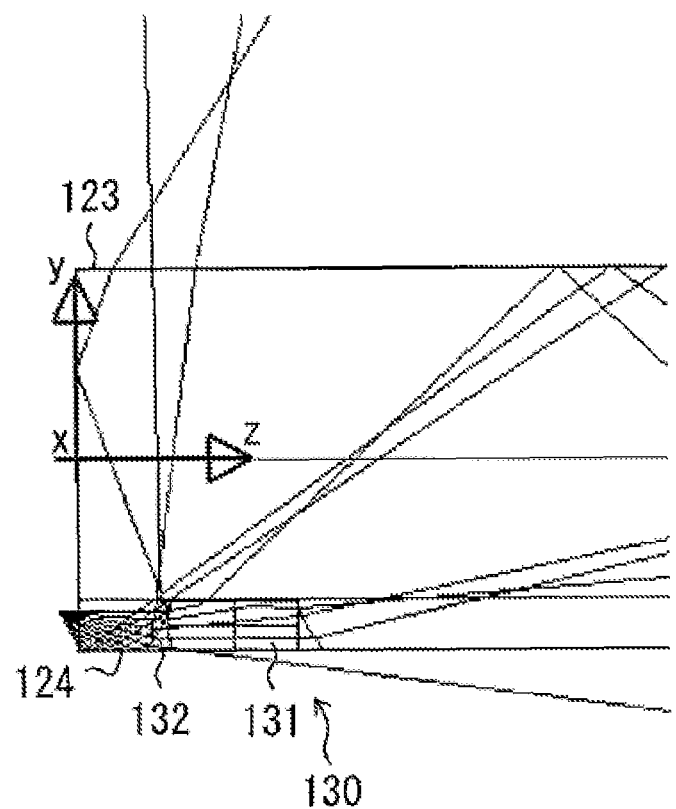
FIG. 16 is a sectional view illustrating an optical path of the light beam when the light beam is incident to the light guide plate including the conventional reflection pattern from a side-surface side of the reflection pattern.

FIG. 13 is a plan view illustrating a light emitting device 2 provided with a light guide plate (light guide body) 20a according to the second embodiment. As illustrated in FIG. 13, the light emitting device 2 includes light sources 12a to 12c and the light guide plate 20a.

(Light Sources 12a to 12c)

The light sources 12a to 12c are light emitting elements that emit the light beams toward the side surface of the light guide plate 20a. The light sources 12a to 12c are arranged on the side of the second side surface 22 of the light guide plate 20a. The light beams emitted from the light sources 12a to 12c are incident to the light guide plate 20a from the first side surface 21, and propagate in the light guide plate 20a while being totally reflected by the surface 23 and the back surface 24 of the light guide plate 20a, and the light beams exit from light emitting areas A to E set in the surface 23 of the light guide plate 20a.

(Light Guide Plate 20a)

The light guide plate 20a guides the light beams emitted from the light sources 12a to 12c, and causes the light beams to exit from the surface (light exit surface) 23. Specifically, in the light guide plate 20a, the light beams incident from the light sources 12a to 12c exit from the light emitting areas A to E set in the surface 23.

In the back surface 24 of the light guide plate 20a, the plurality of reflection patterns 30 are formed in the reflection areas corresponding to the light emitting areas A to E in order to specularly reflect the light beams, which are incident from the light sources 12a to 12c and propagate in the light guide plate 20a, toward the light emitting areas A to E. That is, the plurality of reflection patterns 30 are arranged in the reflection areas corresponding to the light emitting areas A to E such that the pointed ends e are located in the direction orthogonal to the traveling direction of the reflected light beam.

Specifically, the plurality of reflection patterns 30 are arranged in the reflection area corresponding to the light emitting area A such that the pointed end e is located in the direction orthogonal to the traveling direction of a light beam La incident from the light source 12a. The plurality of reflection patterns 30 are arranged in the reflection area corresponding to the light emitting area B such that the pointed end e is located in the direction orthogonal to the traveling direction of a light beam Lb incident from the light source 12c. The plurality of reflection patterns 30 are arranged in the reflection area corresponding to the light emitting area C such that the pointed end e is located in the direction orthogonal to the traveling direction of a light beam Lc incident from the light source 12b. The plurality of reflection patterns 30 are arranged in the reflection area corresponding to the light emitting area D such that the pointed end e is located in the direction orthogonal to the traveling direction of a light beam Ld incident from the light source 12c. The plurality of reflection patterns 30 are arranged in the reflection area corresponding to the light emitting area E such that the pointed end e is located in the direction orthogonal to the traveling direction of a light beam Le incident from the light source 12a.

<Effect of Light Emitting Device 2>

In the light emitting device 2 of the second embodiment, the plurality of reflection patterns 30 are arranged in the reflection areas corresponding to the light emitting areas A to E set in the surface of the light guide plate 20a such that the pointed ends e are located in the direction orthogonal to the traveling direction of the reflected light beam.

Therefore, for example, in a case where the light source 10 is lit, the light beam incident from the light source 10 is reflected toward the light emitting area A by the reflection pattern 30 arranged in the reflection area corresponding to the light emitting area A, whereby the annular light emitting area A is displayed in the surface 23 of the light guide plate 20. At this point, the reflection pattern 30 arranged in the reflection area corresponding to the light emitting area B is irradiated with the light beam Le from the oblique direction (that is, the direction oblique to the major axis direction of the reflection pattern 30), and the emission of the reflection pattern 30 irradiated with the light beam Le is constrained. However, the emission of the light emitting area B is not observed.

Thus, in the reflection pattern 30, the emission of the reflection pattern 30 irradiated with the light beam from the direction oblique to the major axis direction can be constrained.

Accordingly, in the second embodiment, the light emitting device 2 that suitably performs the light separating presentation of the light emitting areas A to E displayed in the surface 23 of the light guide plate 20a can be made.

The present invention is not limited to the above embodiments, but various changes can be made without departing from the claims. Embodiments obtained by a proper combination of disclosed technical means is also included in the technical scope of the present invention.

One or more embodiments of the present invention can be applied to the light guide body that guides the light beam incident from the light source and causes the light beam to exit from the light exit surface, and the light emitting device provided with the light guide body. For example, the light emitting device can suitably mounted on game machines such as a pachinko game machine and a slot machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A reflection structure configured to be disposed on a light guide body that guides a light beam incident from a light source and causes the light beam to exit from a light emitting area set in a light exit surface, comprising
a reflection surface that reflects the light beam emitted from the light source toward the light emitting area,
wherein, when the reflection structure is viewed from a direction perpendicular to the light exit surface, a pointed end is arranged in a direction orthogonal to a traveling direction of the reflected light beam, and an angle formed between the traveling direction of the reflected light beam and a normal direction of an end edge of the reflection surface connected to the pointed end is less than or equal to:

$-38.327x^2+152.3x-94.014,$ wherein x is a refractive index of the light guide body.
2. The reflection structure according to claim 1, wherein the reflection structure is a spindle shape when viewed from a direction perpendicular to the light exit surface.
3. The reflection structure according to claim 1, wherein the reflection structure totally reflects the light beam incident from the light source.
4. A light guide body that guides a light beam incident from a light source, comprising:
a light exit surface comprising a light emitting area from which the light beam from the light source is guided by the light guide body to exit; and
a reflection structure comprising:
a reflection surface that reflects the light beam emitted from the light source toward the light emitting area,
wherein, when the reflection structure is viewed from a direction perpendicular to the light exit surface, a pointed end is arranged in a direction orthogonal to a traveling direction of the reflected light beam, and an angle formed between the traveling direction of the reflected light beam and a normal direction of an end edge of the reflection surface connected to the pointed end is less than or equal to:

$-38.327x^2+152.3x-94.014,$ wherein x is a refractive index of the light guide body.
5. The light guide body according to claim 4,
wherein the light emitting area comprises:
a first light emitting area from which a first light beam exits, and
a second light emitting area from which a second light beam exits,
wherein the second light beam is incident from a direction substantially orthogonal to the first light beam, and
wherein, when the light guide body is viewed from a direction perpendicular to the light exit surface:
the reflection structure reflecting the first light beam toward the first light emitting area is arranged such that the pointed end is located in a direction substantially orthogonal to the traveling direction of the first light beam, and
the reflection structure reflecting the second light beam toward the second light emitting area is arranged such that the pointed end is located in a direction substantially orthogonal to the traveling direction of the second light beam.
6. The light guide body according to claim 5, wherein the first light emitting area and the second light emitting area partially overlap with each other.
7. A light emitting device comprising:
a light source that emit a light beam;
a light guide body that guides the light beam incident from the light source, comprising:
a light exit surface comprising a light emitting area from which the light beam from the light source is guided by the light guide body to exit; and
a reflection structure comprising:
a reflection surface that reflects the light beam emitted from the light source toward the light emitting area,
wherein, when the reflection structure is viewed from a direction perpendicular to the light exit surface, a pointed end is arranged in a direction orthogonal to a traveling direction of the reflected light beam, and an angle formed between the traveling direction of the reflected light beam and a normal direction of an end edge of the reflection surface connected to the pointed end is less than or equal to:

$-38.327x^2+152.3x-94.014,$ wherein x is a refractive index of the light guide body.
8. The light emitting device according to claim 7, wherein the light source is a light emitting diode.
9. The light emitting device according to claim 7, further comprising a light flux controller that controls a light flux of the light beam emitted from the light source.
10. A game machine comprising the light emitting device according to claim 7.

11. The reflection structure according to claim 2, wherein the reflection structure totally reflects the light beam incident from the light source.

12. The light emitting device according to claim 8, further comprising a light flux controller that controls a light flux of the light beam emitted from the light source.

13. A game machine comprising the light emitting device according to claim 8.

14. A game machine comprising the light emitting device according to claim 9.

15. The light guide body according to claim 4, wherein the reflection structure is a spindle shape when viewed from a direction perpendicular to the light exit surface.

16. The light guide body according to claim 4, wherein the reflection structure totally reflects the light beam incident from the light source.

17. The light emitting device according to claim 7, wherein the light emitting area comprises:
 a first light emitting area from which a first light beam exits, and
 a second light emitting area from which a second light beam exits,
 wherein the second light beam is incident from a direction substantially orthogonal to the first light beam, and
 wherein, when the light guide body is viewed from a direction perpendicular to the light exit surface:
  the reflection structure reflecting the first light beam toward the first light emitting area is arranged such that the pointed end is located in a direction substantially orthogonal to the traveling direction of the first light beam, and
  the reflection structure reflecting the second light beam toward the second light emitting area is arranged such that the pointed end is located in a direction substantially orthogonal to the traveling direction of the second light beam.

18. The light emitting device according to claim 17, wherein the first light emitting area and the second light emitting area partially overlap with each other.

* * * * *